(12) United States Patent
Nagengast et al.

(10) Patent No.: US 9,291,204 B2
(45) Date of Patent: Mar. 22, 2016

(54) ROLLING BEARING WITH A LATERAL FILLING OPENING

(75) Inventors: Gerhard Nagengast, Heroldsbach (DE); Jörg-Oliver Hestermann, Aurachtal (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/003,463

(22) PCT Filed: Feb. 27, 2012

(86) PCT No.: PCT/EP2012/053228
§ 371 (c)(1),
(2), (4) Date: Sep. 6, 2013

(87) PCT Pub. No.: WO2012/123239
PCT Pub. Date: Sep. 20, 2012

(65) Prior Publication Data
US 2013/0343685 A1  Dec. 26, 2013

(30) Foreign Application Priority Data

Mar. 17, 2011 (DE) .......................... 10 2011 005 725

(51) Int. Cl.
*F16C 43/06*  (2006.01)
*F16C 19/38*  (2006.01)
(Continued)

(52) U.S. Cl.
CPC ................. *F16C 43/06* (2013.01); *F16C 19/38* (2013.01); *F16C 33/513* (2013.01); *F16C 33/7893* (2013.01); *F16C 2300/14* (2013.01)

(58) Field of Classification Search
CPC .... F16C 19/38; F16C 19/386; F16C 33/4605; F16C 33/4664; F16C 33/48; F16C 33/485; F16C 33/50; F16C 33/502; F16C 33/51; F16C 33/513; F16C 33/542; F16C 33/7893; F16C 43/06; F16C 2300/14
USPC .......... 384/559, 560, 561, 578, 573, 572, 575
See application file for complete search history.

(56) References Cited

U.S. PATENT DOCUMENTS 1,247,288 A * 11/1917 Laycock ........................ 384/561
1,970,699 A    8/1934 Herrmann ...................... 308/214
(Continued)

FOREIGN PATENT DOCUMENTS

DE            43 43 277 A1   6/1994
DE    11 2004 000 625 T2   2/2006
(Continued)

*Primary Examiner* — Alan B Waits
(74) *Attorney, Agent, or Firm* — Fitzpatrick, Cella, Harper & Scinto

(57) ABSTRACT

The invention concerns a rolling bearing (1; 1') with a one-piece outer bearing ring (3) and a one-piece inner bearing ring (2), and with rolling elements (4) arranged in at least one row between the bearing rings (2, 3). Provision is made in this rolling bearing that the outer bearing ring (3) and/or the inner bearing ring (2) has, on the axial end face, at least one cutout (10) through which the rolling elements (4) can be placed into the space between the bearing rings (2, 3), that the cutout (10) can be covered with a reversibly attachable cap (9), and that the cap (9) forms a rim (11) for guiding the rolling elements (4). The lateral cutout (10) for filling the rolling bearing (1) with rolling bodies permits cage solutions of segmented or strip design that are larger than a rolling element and hence can accommodate multiple rolling elements. The suitability of the rolling bearing for high rotational speeds and the stiffness of the rolling bearing are increased as a result.

14 Claims, 4 Drawing Sheets

(51) Int. Cl.
  *F16C 33/46* (2006.01)
  *F16C 33/51* (2006.01)
  *F16C 33/78* (2006.01)

(56) References Cited

U.S. PATENT DOCUMENTS

| | | | |
|---|---|---|---|
| 3,948,578 A | 4/1976 | Martin | 308/214 |
| 3,995,919 A * | 12/1976 | Boeck et al. | 384/564 |
| 4,787,758 A * | 11/1988 | Jacob | 384/559 |
| 5,433,535 A * | 7/1995 | Hah | 384/564 |
| 5,501,533 A * | 3/1996 | Williams et al. | 384/572 |
| 6,019,518 A * | 2/2000 | Yoon | 384/560 |
| 7,478,479 B2 * | 1/2009 | Ohno | 29/898.051 |
| 2002/0048420 A1 * | 4/2002 | Kato | 384/618 |
| 2003/0077017 A1 * | 4/2003 | Fugel et al. | 384/578 |
| 2006/0280394 A1 | 12/2006 | Michioka et al. | 384/588 |
| 2009/0208152 A1 * | 8/2009 | Masuda et al. | 384/100 |
| 2012/0063713 A1 * | 3/2012 | Beuerlein | 384/576 |

FOREIGN PATENT DOCUMENTS

| | | |
|---|---|---|
| DE | 20 2007 014 770 U1 | 1/2008 |
| DE | 10 2007 013 944 A1 | 9/2008 |

\* cited by examiner

ROLLING BEARING WITH A LATERAL FILLING OPENING

CROSS REFERENCE TO RELATED APPLICATION

The present application is a national-stage entry under 35 U.S.C. 371 of International Application No. PCT/EP2012/053228 filed on Feb. 27, 2012, and claims the benefit of foreign priority under 35 U.S.C. 119(a)-(d) of German Application No. 10 2011 005 725.0 filed on Mar. 17, 2011.

FIELD OF THE INVENTION

The invention concerns a rolling bearing with a one-piece outer bearing ring and a one-piece inner bearing ring, and with rolling elements arranged in at least one row between the bearing rings.

BACKGROUND OF THE INVENTION

Generic rolling bearings are used as axial/radial bearings or tilting moment bearings in machine tools, such as in circular tables, for instance. However, they are also employed where lower demands are placed on the rolling bearings, for example in the axes of rotation in materials handling machinery or in solar panels.

Prior art rolling bearing types for applications of this nature are axial/radial cylindrical roller bearings, crossed roller bearings, or inclined roller bearings, although these have some disadvantageous characteristics. For instance, such cylindrical roller bearings generally are poorly suited for high rotational speeds, and, because of their customary multi-part construction, have structural disadvantages in their stiffness. The cited crossed roller bearing types have only limited load capacity, stiffness, and suitability for high rotational speeds. Prior art generic inclined roller bearings, like crossed roller bearings, disadvantageously have fill plugs for sealing filling openings in the bearing rings, often cannot be screwed on, do not constitute a structural unit, and thus are only of limited suitability for machine tools in the prior art form.

Thus, known from DE 10 2007 013,944 A1 are double-row inclined roller bearings with a one-piece outer bearing ring and a one-piece inner bearing ring, between which are arranged two rows of cylindrical rolling elements in an "O" arrangement. These inclined roller bearings are filled through a filling opening that is inclined radially outward in the outer bearing ring and inclined radially inward in the inner bearing ring. After the rolling elements have been placed in the intermediate space between the bearing rings, the filling openings are sealed with fill plugs. The fill plugs are produced as plastic spheres or as locating bearings produced by non-cutting means. It is disadvantageous in these inclined roller bearings that the rolling elements briefly leave their races in their primary direction of force when passing the filling openings and come into contact with the applicable filling body, subsequently touching down on the rolling element raceway again. This brief interruption in the uniform progress of the rolling elements, together with the fact that either no spacers or only very small spacers can be placed between the rolling elements during filling of the races on account of the cylindrical fill plug opening, prevent high rotational speeds, reduce the maximum load capacity of the bearing, and promote wear of the bearing DE 11 2004 000,625 T5 likewise discloses geared cross roller bearings in which an inner bearing ring and an outer bearing ring are each provided with a filling opening for receiving the rolling elements that are each sealed with a fill plug after the rolling elements have been inserted. This bearing also has the aforementioned disadvantages.

OBJECT OF THE INVENTION

The object of the invention is to provide a rolling bearing of the initially described type in which there is no need for the use of a fill plug to seal the opening, and which avoids a design that can only be optimized for one factor, which is to say for either rotational speed or stiffness.

SUMMARY OF THE INVENTION

The invention is based on the finding that the formation of an easily accessible and clearly visible cutout in the end face of a bearing ring makes it possible to place the rolling elements in the rolling bearing more easily and more reliably than hitherto, and that a reversible covering of the filling opening with a cap makes it possible to eliminate the use of fill plugs. The end-face cutouts and their caps are located outside the primary load direction, are not rolled over by the rolling elements, hence do not diminish the load capacity of the bearing, and make it possible to introduce larger cage solutions than is possible through the prior art fill plug bores.

The invention accordingly starts from a rolling bearing with a one-piece outer bearing ring and a one-piece inner bearing ring, and with rolling elements arranged in at least one row between the bearing rings. To achieve the object, provision is made in this rolling element that the outer bearing ring and/or the inner bearing ring has, on the axial end face, at least one cutout through which the rolling elements can be placed into the space between the bearing rings, that the cutout can be covered with a reversibly attachable cap, and that the cap forms a rim for guiding the rolling elements.

The rolling bearing can be implemented as a single-row or multi-row inclined roller bearing, a cylindrical roller bearing, or a combined axial/radial bearing.

In contrast to known generic rolling bearings with a fill plug, the cap in the rolling bearing according to the invention is not located inside a fill channel for the rolling elements in the primary load direction of the bearing, but rather on the axial and radial end of the associated rolling element raceways. As a result, a bearing cage or the rolling elements can run axially along such a cap directly, nearly load-free, and with low friction.

Another advantage of the rolling bearing according to the invention is that the inner bearing ring and the outer bearing ring are constructed as one piece. Moreover, the compact dimensions, especially in the axial length of the rolling bearing, for the first time make possible a circular axis bearing unit with improved performance characteristics, such as without disruptive fill plugs in the rolling element raceway or primary load direction.

In one embodiment of the invention, provision is made for the rolling elements to roll on races that are inclined at an angle to the longitudinal axis of the bearing, for the rolling elements to be arranged in two rows that are positioned in an "O" arrangement with respect to one another, and for the outer bearing ring to have two cutouts that can each be reversibly covered or sealed with a cap, wherein the caps form rims that guide the rolling elements axially.

According to another embodiment, provision can alternatively be made for the rolling elements to roll on races that are inclined at an angle to the longitudinal axis of the bearing, for the rolling elements to be arranged in two rows that are positioned in an "X" arrangement with respect to one another, and for the inner bearing ring to have two cutouts that can each be reversibly covered with a cap, wherein the caps form rims.

The said stop faces of these rims for the rolling elements preferably are designed to be perpendicular to the rolling element axis of rotation. It is also possible for the said stop faces of the rims to be designed at an angle somewhat greater than 90° to the rolling element axis of rotation, which is to say to be implemented as inclined rims.

Such a rolling bearing according to the invention, for example a double-row inclined roller bearing, is characterized by one-piece, and hence inherently stiff, bearing rings whose races are not interrupted in the direction of loading by a fill plug. The races are easily accessible through the lateral caps, thus making it possible to fill the rolling bearing with the rolling elements more simply than was previously the case through narrow fill channels with poor visibility and poor ability to influence the correct positioning of the rolling elements in the radial raceway gap between the bearing rings.

Provision is made according to another embodiment for the said cutouts to be arranged to be mutually offset with respect to the circumference, each of which can be reversibly covered or sealed with a cap.

In addition, provision is preferably made for the at least one cap and the associated cutout to be large enough that spacers separating the rolling elements, namely cage segments or cage strips, can be introduced between the bearing rings through the at least one cutout. The relatively wide lateral opening of the bearing accordingly makes it possible to insert entire cage segments or a cage strip without interruption or weakening of the race geometry in the direction of power flow.

The cap advantageously can be reversibly secured to the bearing ring using a fastening element. A screw, pin, or other component suitable for securing the cap to the bearing ring may serve as the fastening element. If the fastening element is a screw, the bearing ring has, in its associated end face, a bore with a thread for accommodating the screw.

Instead of the spacers customarily arranged in the raceway gap in crossed/inclined roller bearings, which together with the rolling elements require all the available space in the bearing system, according to another preferred embodiment of the invention the rolling elements are accommodated in cage segments that keep the rolling elements spaced apart from one another.

The cage segments preferably each accommodate two rolling elements in appropriate pockets, and are guided radially at the outer and inner bearing rings. The rolling elements are spaced apart reliably and with low friction by webs on the cage segments, and are also guided in the circumferential direction by these webs, and the webs furthermore leave a good deal of space between the rolling elements to accommodate lubricant. This increases the rolling bearing's service life, functional reliability, and suitability for relatively high rotational speeds.

The cage segments preferably are designed with a radial bend to permit the largest possible race width, which additionally increases their stability. Preferably, the cage segments are designed such that the entire running surface of the rolling element can be used.

The cage segments or the cage strip have, preferably on the end face, a sealing or stop strip or a sealing or stop web, by which means the friction of the applicable cage segments at the rim of the cap is minimized. The sealing or stop strips of the cage segments simultaneously take on a sealing function against lubricant leakage and keep contaminants from getting in between the outer and inner bearing rings. The cage segments preferably are made of plastic and can be snapped together with the adjacent cage segments as needed when they are introduced into the raceway gap. To this end, provision is made for the cage segments to have, at their ends, latching means with which they can be connected to adjacent cage segments.

Alternatively, the cage segments can also be implemented in different materials matched to the applicable bearing application, for example in brass or aluminum for higher temperatures or increased mechanical loads. The special angled pocket form of the segments causes them to support themselves on the rolling element so that the cage is largely guided by the rolling elements, with the result that the width of the races can, within broad limits, be designed freely as dictated by the application. For example, a deliberate relief of the rim edges can achieve more clearance for grease storage, or any desired inclination or width design of the races can optimize the bearing for further increases in rotational speed by minimizing friction.

Thus, provision can be made for the rims on the inner ring, on the outer ring, and/or on the caps to be designed such that they only contact the rolling elements at a part of their axial end face, and for pockets to accommodate a lubricant to be formed in the rims and/or in the bearing rings along the remaining portion of their axial end face.

The lateral caps preferably are placed in the flat surface of the affected bearing ring as early as during the pre-heat-treatment machining phase (turning and drilling) of said bearing ring, and remain therein for further processing, such as hardening and grinding or finishing, of the bearing ring. In conjunction with the fastening elements, for instance countersunk screws, the important reproducible positioning of the caps for later filling with rolling elements during assembly is reliably ensured. It is thus also ensured by this means that no transitions that would cause malfunctions are produced on the rims during removal of the caps for filling the rolling bearings with cage segments and rolling elements, as well as their later securing to the bearing ring. The rolling elements and cage segments thus slide steadily and always uniformly smoothly over an always reproducible interface in the region of the filling opening of the bearing ring in question.

BRIEF DESCRIPTION OF THE DRAWINGS

The invention is explained further below using the attached drawings referring to two exemplary embodiments. Shown are.

DETAILED DESCRIPTION OF THE DRAWINGS

Figure 1:
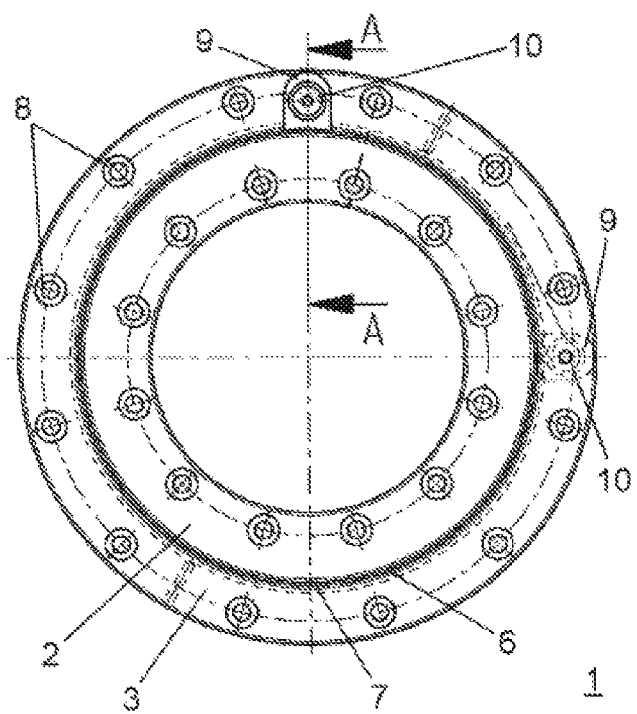
FIG. 1 an axial top view of an inclined roller bearing according to the invention, FIG. 2 a cross-section along the line A-A through the inclined roller bearing shown in FIG. 1, FIG. 3 a three-dimensional representation of a cage segment, and FIG. 4 a top view of an inclined roller bearing somewhat modified as compared to FIG. 1.
Figure 2:
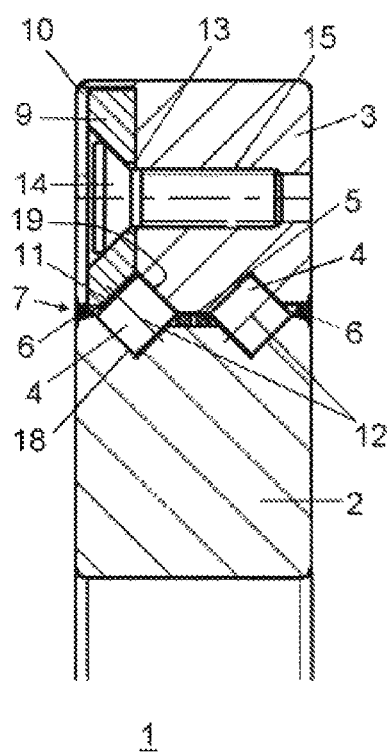

FIG. 1 shows an end view, and FIG. 2 shows a longitudinal section along line A-A from FIG. 1, of a rolling bearing 1 according to the invention in the embodiment as an inclined roller bearing with two rolling element rows in an "O" arrangement with a one-piece inner bearing ring 2 and a one piece outer bearing ring 3. The cage segments 5 have a sealing or stop strip 6, which serve the purpose of axial contact of the cage segments 5 at a bearing ring rim and at the end-face cap 9, and which thus guide the rolling elements axially, and which additionally seal the gap 7 formed between the bearing rings 2, 3.

As shown in the end view in FIG. 1, the inner and outer rings 2, 3 have a plurality of bores 8 on the end face that serve to receive fastening means such as screws, with which the bearing rings 2, 3 can be attached to rotating or stationary parts during installation of the rolling bearing 1, for example in a machine tool.

Figure 4:
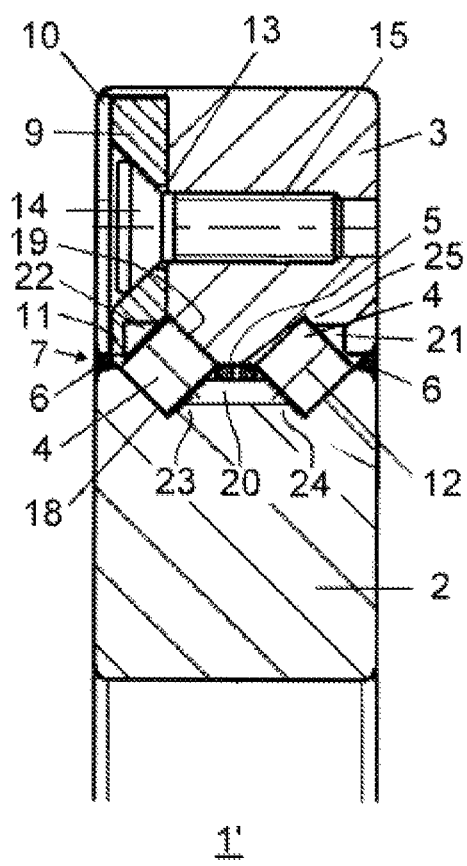

If the rolling bearing 1 is implemented as a double-row roller bearing in an "O" arrangement, as shown in FIGS. 1, 2, and 4, it has at least one lateral cap 9 for each bearing row, which cap extends circumferentially by a small area so that a filling opening for the rolling elements 4 made axially therebehind in the outer bearing ring 3 is covered. In this way, lateral filling through the less loaded, and hence less critical, axial raceway width (rim) is made possible.

In the embodiment of the invention shown in FIG. 1, the caps 9 are offset from one another by 90° and are detachably attached with a countersunk screw as the fastening element.

FIG. 2 shows the rolling bearing 1 according to the invention as a preloaded, double-row, axially short, inclined roller bearing with two single inclined roller raceways 18, 19 on one-piece inner and outer rings 2, 3. The rolling elements 4 are positioned in an "O" arrangement with respect to one another and are preloaded, by which means the two races 18, 19 in the inner bearing ring 2 and outer bearing ring 3 can be produced economically with the same diamond dresser with straight stroke. The rolling bearing 1 can be filled with rolling elements 4 through the lateral cap (or cover) 9 with easy accessibility from the side during installation. As a result, the races 18, 19 can dispense with fill plugs, and thus are uninterrupted and can accommodate higher loads while being functional reliable than can races having fill plugs.

As FIG. 2 shows, the cap 9 is located in a cutout 10 in the outer bearing ring 3. The cap 9 additionally forms an inclined rim 11 on the axially inner side; the applicable rolling element axis of rotation 12 is perpendicular to the surface of said rim closest to the rolling element. As a result, the axial outer end face of the rolling element 4, accommodated in the cage segments 5, points toward the rim 11 of the cap 9.

In order to secure the cap 9 to keep it from falling out of the cutout 10 in the outer bearing ring 3, it has a bore 13, through which the fastening element 14 is passed and can be reversibly secured in a bore 15 in the outer bearing ring 3, for example by means of a thread.

The rolling elements 4 are preferably arranged in cage segments 5, as already mentioned above. However, it is also possible to use spacers or a cage strip in place of the cage segments 5.

The arrangement of two rolling elements 4 in each cage segment 5, and the resultant omission of spacers in conventional crossed or inclined roller bearings, allows for far larger grease chambers with optimized rolling element stops. Consequently, higher operational reliability at high speeds is possible. The reduced contact areas reduce the friction, and hence the rotational resistance of the rolling bearing 1. They are also easier to install than individual spacers, which must each be positioned between two adjacent rolling elements 4.

Figure 3:
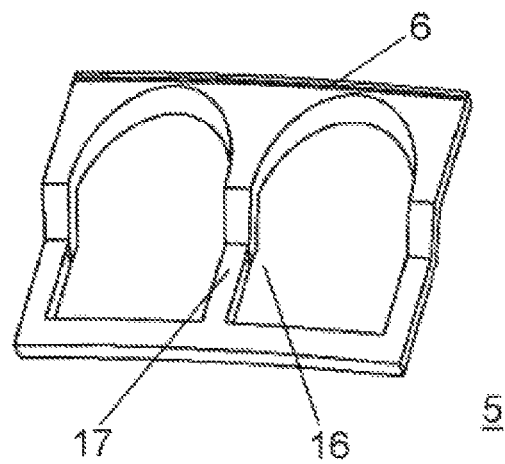

FIG. 3 shows an embodiment of a suitable cage segment 5 with a sealing or stop strip 6 and cage pockets 16 with webs 17 optimized for roller running. The webs 17 in this embodiment are designed with a radial bend to improve their stability with regard to their installation position in the rolling bearing 1, among other reasons.

The rolling bearing 1 according to the invention is suitable as a combined axial/radial bearing or as a tilting moment bearing for use in machine tools, such as in circular tables, spindle bearings, and feed spindle bearings, but its use is also possible in applications with less demanding requirements, for example to support the axes of rotation in robots or to support the axes of rotation in solar panels.

FIG. 4 shows a rolling bearing 1' designed according to the invention that is largely identical to the rolling bearing 1 shown in FIG. 1. In contrast to the latter, however, the rolling bearing 1' has a circumferential lubricant pocket 20 between the races of the two rolling element rows, as a result of which the rims 23, 24 formed on the axial inner side of the inner ring 2 are reduced in size to the benefit of a lubricant storage space in the bearing that is larger overall. It is evident that the contact surface of these axially inner rims 23, 24 on the inner ring do not extend past the rolling element axis of rotation 12. Preferably, the axially inner rims 23 and 24 will extend to a maximum of approximately one third of the rolling element diameter in order to minimize friction and maximize the lubricant storage space in the bearing. Only in crossed roller bearings or double-row inclined roller bearings will the applicable rims preferably extend over the entire rolling element diameter.

In addition, the outer ring 3 of the rolling bearing 1' has, in the region of its rim 25, a circumferential lubricant pocket 21, with the result that a shortened, but adequate, axial support surface for the rolling elements 4 is present here as well. In like manner, the rim 11 of the at least one cap 9 has a circumferential lubricant pocket 22, which likewise constitutes a comparatively short, but completely adequate, axial support surface for the rolling elements 4, and enlarges the lubricant storage space present as a whole in the rolling bearing 1'.

LIST OF REFERENCE NUMERALS 1, 1' rolling bearing
2 inner bearing ring
3 outer bearing ring
4 rolling element
5 cage segment
6 sealing strip, stop strip
7 gap
8 bore
9 cap
10 cutout
11 rim on the cap
12 rolling element axis of rotation
13 bore in the cap 9
14 fastening element
15 bore in the outer bearing ring 3
16 cage pocket
17 web
18 race
19 race
20 lubricant pocket in the inner ring
21 lubricant pocket in the outer ring
22 lubricant pocket in the cap
23 rim on the inner ring
24 on the inner ring
25 rim on the outer ring

The invention claimed is:
1. A rolling bearing comprising:
a one-piece outer bearing ring;
a one-piece inner bearing ring; and
rolling elements arranged in at least one row between the inner and outer bearing rings, wherein at least one of the outer bearing ring and the inner bearing ring has, on an axial end face, at least one cutout through which the rolling elements can be placed into a space extending from the inner bearing ring to the outer bearing ring, the at least one cutout being covered with a removably attachable cap, such that the cap forms a rim for guiding the rolling elements, the rim having an inclined surface that is inclined at a first angle relative to the longitudinal axis of the rolling bearing and covers the space, wherein the inclined surface is perpendicular with respect to an axis of rotation of the rolling elements, and wherein the rolling elements roll on races that are inclined at a second angle relative to the longitudinal axis of the rolling bearing.

2. The rolling bearing according to claim 1, wherein the rolling elements are arranged in two rows that are positioned in an "O" arrangement with respect to one another, and the outer bearing ring has two of the cutouts.

3. The rolling bearing according to claim 2, wherein the cutouts are arranged to be mutually offset with respect to the circumference of the rolling bearing.

4. The rolling bearing according to claim 1, wherein the cap and the at least one cutout are large enough that at least one of spacers separating the rolling elements, cage segments, and a cage strip can be introduced into the at least one cutout.

5. The rolling bearing according to claim 1, further comprising a fastening element, wherein the cap is removably attached to the rolling bearing using the fastening element.

6. The rolling bearing according to claim 1, wherein the rolling elements are (i) arranged in cage segments, (ii) arranged in a cage strip, or (iii) spaced apart from one another by spacers.

7. The rolling bearing according to claim 6, wherein the rolling elements are arranged in cage segments, and the cage segments each accommodate at least one rolling element in at least one pocket.

8. The rolling bearing according to claim 6, wherein the rolling elements comprise a running surface, and wherein the rolling elements are arranged in cage segments, and the cage segments are designed such that the entire running surface of the rolling element can be utilized for rolling.

9. The rolling bearing according to claim 6, wherein the rolling elements are arranged in cage segments, and the cage segments are designed with a radial bend.

10. The rolling bearing according to claim 6, wherein the rolling elements are arranged in cage segments, and the cage segments have a sealing or stop strip.

11. The rolling bearing according to claim 6, wherein the rolling elements are arranged in cage segments, and the cage segments are made of plastic, brass, or aluminum.

12. The rolling bearing according to claim 6, wherein the rolling elements are arranged in cage segments, and adjacent cage segments are connected to each other.

13. The rolling bearing according to claim 6, wherein the rolling elements are arranged in a cage strip, the cage strip having a sealing or stop strip.

14. The rolling bearing according to claim 1, wherein the rim on at least one of the outer ring, the inner ring, and the cap have at least one lubricant pocket.

* * * * *